Nov. 10, 1953     H. W. HUGHES     2,658,409
CONTROL MECHANISM FOR VEHICLES
Filed Aug. 12, 1952     2 Sheets-Sheet 1
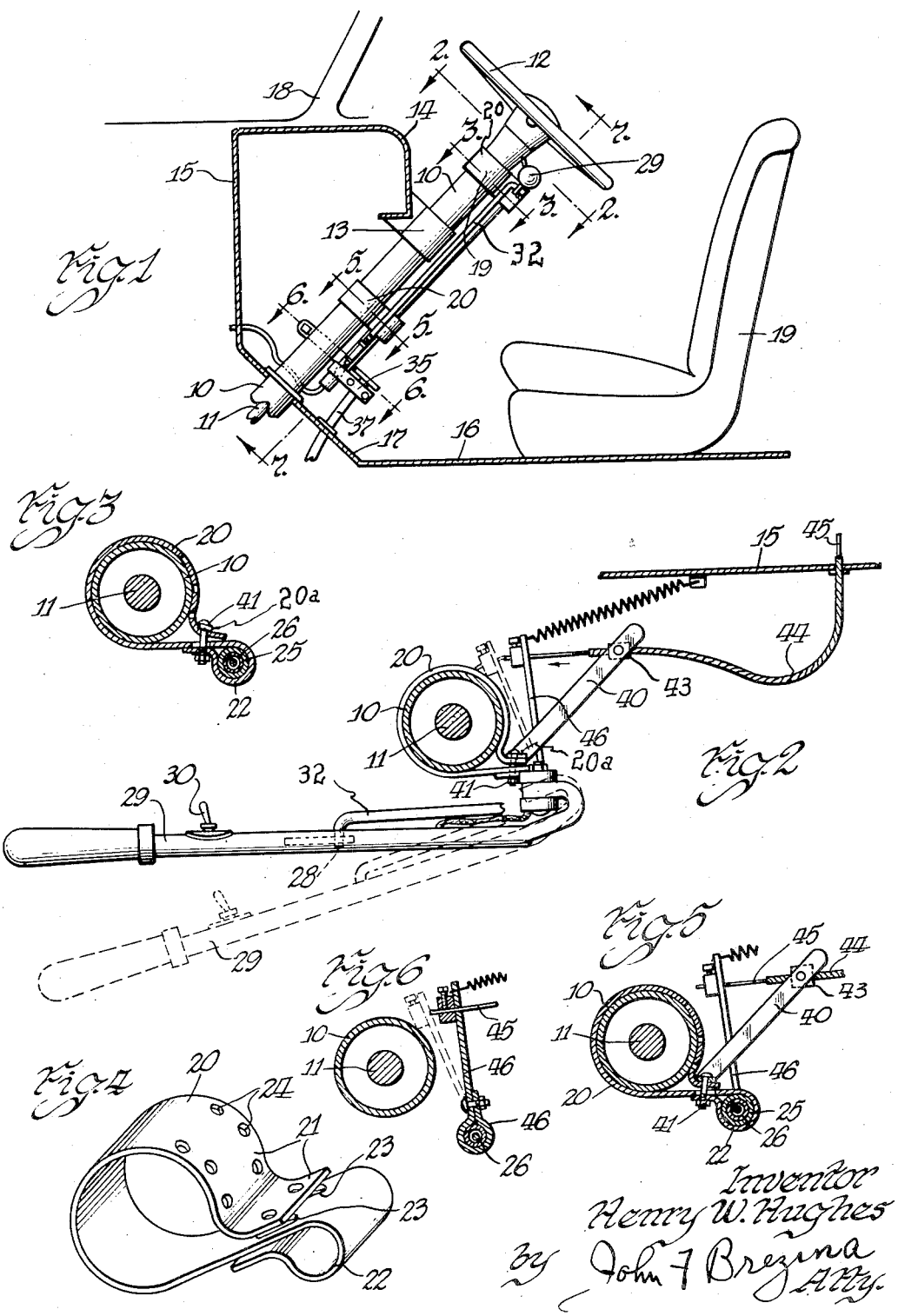

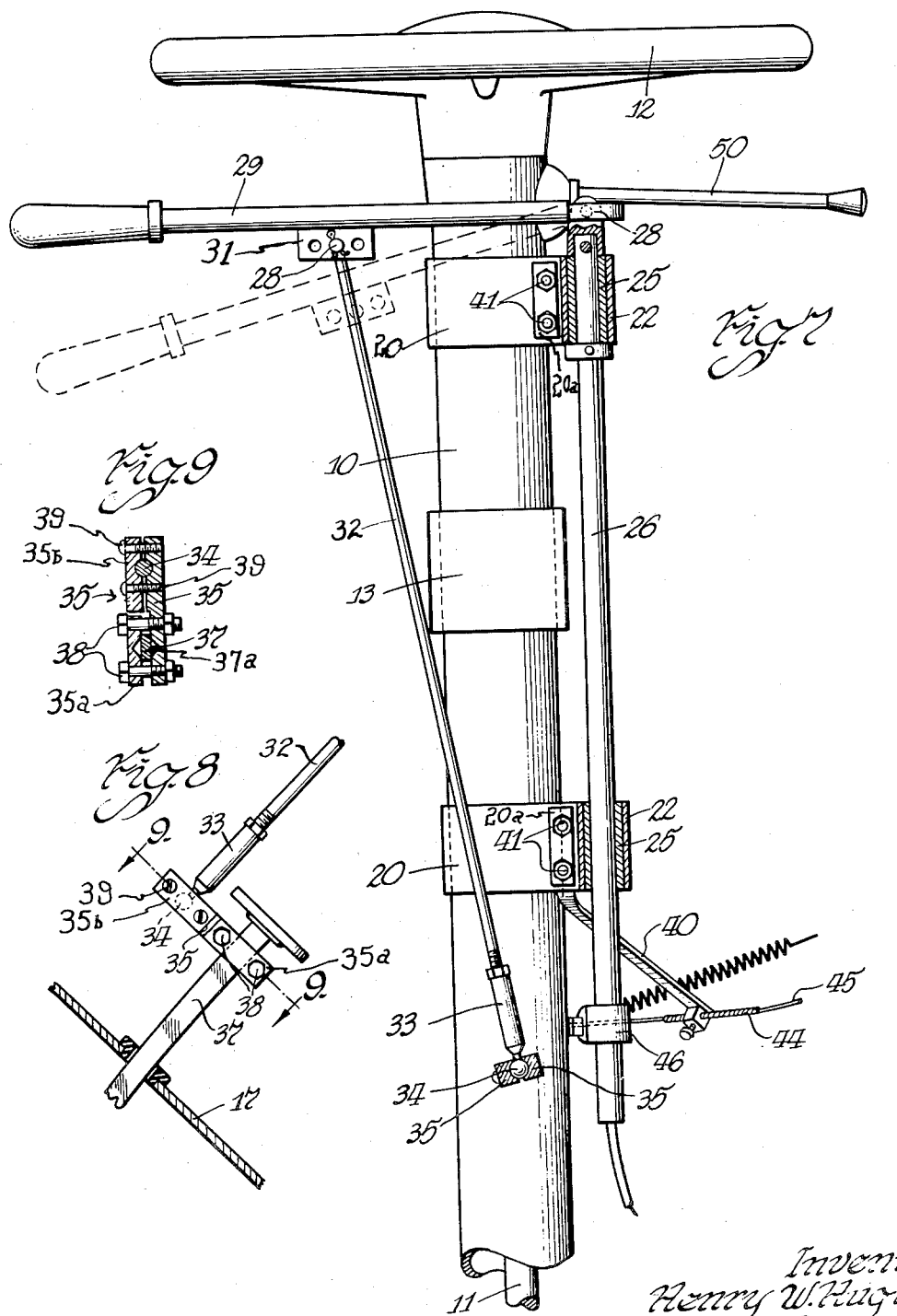

Patented Nov. 10, 1953

2,658,409

UNITED STATES PATENT OFFICE 2,658,409

CONTROL MECHANISM FOR VEHICLES

Harry W. Hughes, River Forest, Ill.

Application August 12, 1952, Serial No. 303,867

3 Claims. (Cl. 74—484)

1

My invention relates to operating controls for automobiles, trucks and like, and more particularly is directed to a combination of cooperable operating control assemblies, adapted to be used by handicapped persons, especially those who have lost partial or all use of their lower limbs. My invention is adapted to be applied either to entirely new automobiles during building, or is adapted to be relatively easily operably mounted upon vehicles already built and in operation.

An object of my invention is the provision of hand operated controls for the brake and accelerator of conventional automobiles which embodies positive and relatively easy operation and control by a single hand of the operator, and which includes a co-acting combination of elements compactly and efficiently assembled and mounted with respect to the vehicle steering column and which permits selective depression of a brake pedal or the like and selective movement of gas feeding means.

A further object and accomplishment of my invention is the provision of a relatively compact manually control adapted to be hand operated and operably connected to selectively move the brake pedal and the gas feeding means to desired positions at any time, and adjustable means for adjustably and rigidly clamping the principal parts in positions substantially adjacent the steering column, and in positions where the same do not interfere with movements of the operator's legs or knees.

I desire to point out that the operation of the clutch, brake and gas feeding means of conventional cars is limited to persons having normal control of their legs, and consequently the operation and pleasure of use of conventional vehicles is limited to persons who have the full and normal usage of their legs and feet so that proper and safe manipulation of the levers and accelerator may be exercised. Because of the relatively large number of persons who have had their legs or feet maimed or injured to an extent making normal automobile operation unsafe for themselves as well as others, it is a great advantage to provide relatively easily mountable and easily operable hand controls for modern vehicles. I have found that such handicapped persons have, to some extent, been driving automobiles having automatic gear shifts, and one or another form of complex hand-operated controls which have been relatively difficult to operate, and of such a nature that substantial strength and energy has been required to operate either one or both foot pedals and the gas control means. Accordingly,

2 it is a further accomplishment of my invention to provide a hand operated control means for vehicles, especially those equipped with automatic gear shifting means, which are compact, sturdy, and relatively easily mounted and installed upon present vehicles, and relatively easily manipulated.

Other and important objects of my invention will be apparent from the following description and appended claims.

Fig. 1 is an elevation taken from the position to the left of the driver and showing my invention in mounted position with respect to a typical steering wheel column.

Fig. 2 is a view looking downward and taken substantially on a plane indicated by line 2—2 of Fig. 1 and showing the steering column in cross section.

Fig. 3 is an enlarged cross section view of one of the adjustable mounting clamps embodying a part of my invention.

Fig. 4 is an enlarged perspective view of one of the adjustable mounting clamps embodying a part of my invention.

Fig. 5 is an enlarged view, with parts in section, taken on a plane indicated by line 5—5 of Fig. 1.

Fig. 6 is an enlarged partially cross sectional view taken on a plane indicated by line 6—6 of Fig. 1.

Fig. 7 is an enlarged elevational view taken substantially from the position of the driver's seat and looking toward the underside of the steering column and showing parts of my invention in elevation.

Fig. 8 is an elevation illustrating the adjustable connection between the manually movable thrust rod or link, only a fragment of which is shown, and the brake pedal.

Fig. 9 is an enlarged cross sectional view of the adjustable clamping means normally connecting the brake pedal and the thrust link which transmits hand operated movement.

As shown on drawings

As shown in Fig. 1, numeral 10 designates a conventional form of steering column in which the steering shaft 11 is suitably mounted and which is manually controlled through a conventional steering wheel 12. Such steering housing or column 10 is suitably secured to a bracket 13 to the vertical portion of the dashboard 14, which may form a continuation of the fire wall or partition 15. Numeral 16 designates the floor of the vehicle body which is the usually upwardly inclined apertured floor board section. Numeral 17 through which the steering column and the usual controls extend. Numeral 18 designates a fragment of a windshield framing part of the body. Numerals 19 and 20 designate a pair of adjustable clamps.

Numeral 19 represents a typical driver's seat in normal position.

As illustrated in Figs. 1 to 5 a metal contractible mounting clamp 20 has an enlarged annular portion terminating in an angularly bent apertured end. The intermediate portion of clamp 20 has a pair of elongated slots 23, and the end portion 21 has a plurality of spaced apart holes 24, as shown in Fig. 4, all the said holes being adapted to register with slots 23 according to the extent to which the larger clamp is bent, the same being adjustable and bendable so as to snugly fit about different sizes of steering columns. It will be understood that when the said clamp or bracket is to be mounted on steering columns of smaller sizes, the enlarged portion of the clamp is bent so that the most inward holes will register with slots 23 and the holes of clamp 22 so that two bolts 41, may be passed therethrough and tightened in the manner shown in Figs. 1, 2, and 3. An apertured metal strap or bar 20a is mounted below the heads of said bolts 41 so that the tension of said bolts will be exerted uniformly and firmly across the width of the end portion of said clamp. Clamp sections 35a and 35 each have an inwardly opening substantially right angled recess 37a to receive and securely clamp brake levers of square-like or irregular cross section as shown in Fig. 9.

A metal or fibre sleeve or bearing 25 is mounted within the smaller clamp 22, as shown in Figs. 3 and 7, after such bearing has been mounted on thrust or operating rod, shaft or lever 26 which is thereby journalled for partial rotation.

A similar adjustable clamp 20 is mounted on the lower portion of the steering column and has a similar bearing 25 in which lever or shaft 26 is journalled said two bearings 25 being in alignment.

The upper end of crank shaft 26 is bifurcated as shown in Figs. 2 and 7, and the said bifurcated end has aligned apertures therein which receive a bolt or pin 28 which passes through an aperture of the back-turned end of hand lever 29 which is seated between the bifurcated portions of lever or shaft 26. Hand lever or handle 29 is preferably passaged longitudinally over its intermediate portion and carries a toggle switch 30 which is connected electrically by wires (a fragment of which are shown in Fig. 2), to the headlights and to the battery circuit so that the operator may selectively dim his lights by hand.

As illustrated in Figs. 7 and 1, handle 29 carries on its intermediate portion a depending ear 31 which has spaced holes therethrough.

A thrust bar or link 32 has its upper angularly bent end pivotally secured in one of the holes of ear 31. The lower end of link 32 is threaded. The internally threaded upper end portion of a connection fitting or coupling 33 is adjustably threaded on the lower end of link 32. The opposite end of coupling 33 has an integral ball 34 which is adapted to be releasably held within a "socket" formed by two opposed recesses formed in the two members or bars of a clamp 35 (see Figs. 8 and 9).

Clamp 35 is composed of three sections, designated as 35a and 35b, shown in cross section in this Figure 9. A short section 35b is secured by two bolts 39 which thread into one end portion of the long clamp section 35 and impinge and rotatably secure the ball 34, which is on the end of coupling 33, as shown in Fig. 7.

A second pair of bolts or screws 38 secure the section 35a to the other end of apertured clamp section 35 and are adapted to impinge and clamp the brake lever 37 at the desired position thereon. It will be noted that the clamp section 35a and section 35 each have an inward opening recessed facing each other so as to conveniently fit over and securely clamp brake levers of either round, rectangular or irregular cross sectional shape.

It will be understood that the adjustable clamp 35 may be secured at the desired height and position on the pedal, and that the coupling 33 may also be rotated and then locked in desired position with the aid of lock nut 33a so that the lever or handle 29 will be in the desired position with regard to the operator and the steering wheel. It will be further understood that application of force on the handle 29 in the direction of the brake pedal will depress such brake pedal to the degree desired and as quickly as desired, and that the usual spring means (not shown) which return the brake pedal to starting upper position will perform the same returning movement in my construction as well as return link 32 and handle 29 to original position.

Referring to Figs. 2, 5 and 7 numeral 40 designates a brace or link of metal whose angularly bent end is secured by bolts 41 to the lower of the two clamps 20. Said brace 40 may extend in an angular downwardly inclined direction as illustrated in Fig. 7, and carries on its outer end a passaged fitting 43 which releasably anchors thereto the end portion of the protective covering 44 of the slidable flexible wire cable 45 which has its end adjustably connected to the arm 46 and to the gas throttle or carburetor mechanism. Metal arm 46 has one end portion securely mounted on the lower end portion of shaft 26, for example by bending and clamping such end portion with the aid of a bolt as shown in Fig. 6.

The end of thrust wire or cable 45 is adjustably connected to the free end of arm 46 by a screw-bearing passaged locking collar member 47 shown in Figs. 5 and 6.

It will be understood that selective manual movement of handle 29 toward and away from the operators lap (that is perpendicularly to the axis of the steering column) will rock shaft 26 to the desired degree, and that movement thereof toward the operator's lap will move the arm 46 and connected wire cable 45 to the left, for example to the dotted line positions in Figs. 5 and 6 and against the action of the spring 48 to thereby feed more gas to the engine and the desired degree of such acceleration and feeding will continue as long as the operator applies any pressure to the handle in the rearwardly inclined direction. When such pressure is released the spring 48 will pull arm 46 and shaft 26 to starting position and likewise wire cable 45 so that the carbureter is placed into an idling position.

Numeral 50 Fig. 7 designates the conventional gear shift lever which controls the automatic transmission mechanism and which lever is positioned by the operator according to desire.

It will be understood that my hand operated control mechanism having the described features may be relatively easily and economically mounted on steering columns of varying sizes due to the adjustability of the novel clamps described, and that the remaining parts may be easily operatively connected in the described manner with respect to the brake pedal and carbureter.

The provision of adjustable coupling 33 and the spaced holes in the ear on handle 29 provides for a wide range of varying of degrees to which the handle 29 has to be depressed for brake operations.

My said invention provides a novel, compact and economical control means enabling handicapped persons who have lost partial or full use of their lower lims to easily and safely drive vehicles having one or another form of automatic gear shifting devices.

I claim:

1. In combination with a steering column and the automatically movable gear selecting and shifting means of a motor vehicle; a shaft journalled adjacent and substantially parallel to said steering column; a handle having one end pivoted to said shaft and extending transversely; an arm mounted on the lower end of said shaft; a spring connecting said arm to a stationary portion of vehicle body; a slidable cable connected to said arm and normally connected to the gas control means of the vehicle; a metal link pivotally connected at one end thereof to an intermediate portion of said handle; a clamp mountable on the brake pedal; and an adjustable connecting member, including a ball joint, pivotally connecting said link and said clamp whereby manual movement of said handle toward or away from said brake pedal will be transmitted to move said brake pedal.

2. In a hand operated control for the brake mechanism and for the gas feeding mechanism of an automobile vehicle; a pair of spaced apart adjustable clamps adapted to be mounted about the steering column, said clamps having integral holding members adapted to provide a pair of aligned bearings; a crank shaft journalled in said bearing members and having a transverse aperture in the upper end thereof; an angular bent handle having one end pivotally connected to the apertured end of said crank shaft; a lever arm having one end secured on the lower end portion of said crank shaft; a flexible slidable cable connected at one end thereof to the free end portion of said arm, the opposite end of said cable being connectable to the gas feeding means of the vehicle; a spring anchorable to a stationary portion of said vehicle and having one end connected to the free end of said arm; a clamp adapted to be mounted upon the vehicle brake lever; a swivel joint connected to said clamp; a metal thrust link pivotally connecting the intermediate portion of said handle and said swivel joint, the downward and forward depression of said handle being adapted to impart brake-depressing movement to a brake pedal.

3. In combination, a hand operated control for the gas feeding means and the brake means of a vehicle substantially as recited in claim 2, and wherein said first mentioned adjustable clamps are formed, of a continuous piece of metal strip and provide an annular holding clamp for the bearings of said crank shaft.

HARRY W. HUGHES.

References Cited in the file of this patent

UNITED STATES PATENTS

| Number | Name | Date |
| --- | --- | --- |
| 2,490,708 | Rogers | Dec. 6, 1949 |
| 2,537,222 | Horne | Jan. 9, 1951 |
| 2,602,348 | Wilson | July 8, 1952 |